(12) United States Patent
Lu

(10) Patent No.: US 11,860,708 B2
(45) Date of Patent: Jan. 2, 2024

(54) APPLICATION PROCESSOR AND MOBILE TERMINAL

(71) Applicant: VIVO MOBILE COMMUNICATION CO., LTD., Guangdong (CN)

(72) Inventor: Chialin Lu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 682 days.

(21) Appl. No.: 16/982,967

(22) PCT Filed: Mar. 21, 2019

(86) PCT No.: PCT/CN2019/079033
§ 371 (c)(1),
(2) Date: Sep. 21, 2020

(87) PCT Pub. No.: WO2019/179493
PCT Pub. Date: Sep. 26, 2019

(65) Prior Publication Data
US 2021/0018973 A1 Jan. 21, 2021

(30) Foreign Application Priority Data
Mar. 23, 2018 (CN) .......................... 201810244394.3

(51) Int. Cl.
*G06F 1/26* (2006.01)
*G06F 1/3234* (2019.01)
(Continued)

(52) U.S. Cl.
CPC .............. *G06F 1/3275* (2013.01); *G06T 1/20* (2013.01); *G06T 1/60* (2013.01); *G06F 1/3203* (2013.01)

(58) Field of Classification Search
CPC . G06F 1/3275; G06F 1/26; G06T 1/20; G06T 1/60; Y02D 10/00
(Continued)

(56) References Cited

U.S. PATENT DOCUMENTS

2013/0002596 A1* 1/2013 Ke ........................ G06F 1/3203
345/173
2013/0057529 A1* 3/2013 Lee ....................... G09G 3/3696
323/234
(Continued)

FOREIGN PATENT DOCUMENTS

CN          101089799 A       12/2007
CN          101271680 A        9/2008
(Continued)

OTHER PUBLICATIONS

CN Office Action in Application No. 201810244394.3 dated Oct. 25, 2019.
(Continued)

*Primary Examiner* — Volvick Derose
(74) *Attorney, Agent, or Firm* — Maschoff Brennan

(57) ABSTRACT

A mobile terminal and an application processor are provided. The mobile terminal includes a power management module, an application processor, a display driver chip, and a display panel. The power management module is used to output a power supply voltage to the application processor, the display driver chip, and display panel. The application processor includes a graphics processor, a graphics random access memory and a display serial interface, where the graphics random access memory is communicably connected with a codec overlay hardware of the graphic processor, and is used to receive and store an image frame outputted by the graphic processor. The graphic random access memory is communicably connected to the display serial interface to output a stored image frame to the display (Continued)

driver chip through a display serial interface. The display driver chip controls the display panel to display the received image frame.

11 Claims, 5 Drawing Sheets

(51) Int. Cl.
*G06T 1/20* (2006.01)
*G06T 1/60* (2006.01)
*G06F 1/3203* (2019.01)

(58) Field of Classification Search
USPC .......................................................... 713/320
See application file for complete search history.

(56) References Cited

U.S. PATENT DOCUMENTS

| | | | |
|---|---|---|---|
| 2013/0100121 A1* | 4/2013 | Cha .................... | H04N 13/161 |
| | | | 345/419 |
| 2013/0194243 A1* | 8/2013 | Um ...................... | G09G 5/393 |
| | | | 345/204 |
| 2015/0033047 A1* | 1/2015 | Byun ...................... | G09G 5/36 |
| | | | 713/320 |
| 2015/0049097 A1* | 2/2015 | Ju ......................... | G06T 1/60 |
| | | | 345/520 |
| 2015/0130824 A1* | 5/2015 | Lee ........................ | G09G 3/20 |
| | | | 345/534 |
| 2015/0195581 A1* | 7/2015 | Lee ...................... | H04N 19/176 |
| | | | 375/240.27 |
| 2015/0254226 A1 | 9/2015 | Renshaw et al. | |
| 2016/0027146 A1* | 1/2016 | Kim ...................... | G09G 3/3208 |
| | | | 345/82 |
| 2017/0076700 A1* | 3/2017 | Yoo ........................ | G09G 5/393 |

FOREIGN PATENT DOCUMENTS

| | | |
|---|---|---|
| CN | 103226935 A | 7/2013 |
| CN | 103593040 A | 2/2014 |
| CN | 104345868 A | 2/2015 |
| CN | 104360979 A | 2/2015 |
| CN | 104637466 A | 5/2015 |
| CN | 105280155 A | 1/2016 |
| CN | 105607725 A | 5/2016 |
| CN | 105829996 A | 8/2016 |
| CN | 108519807 A | 9/2018 |
| WO | 2011110098 A1 | 9/2011 |
| WO | 2017010822 A1 | 1/2017 |

OTHER PUBLICATIONS

CN Search Report in Office Action in Application No. 201810244394.3 dated Nov. 19, 2018.
Written Opinion and International Search Report in Application No. PCT/CN2019/079033 dated Oct. 8, 2020.

* cited by examiner

APPLICATION PROCESSOR AND MOBILE TERMINAL

CROSS-REFERENCE TO RELATED APPLICATION

This application is a U.S. national phase application of a PCT Application No. PCT/CN2019/079033 filed on Mar. 21, 2019, which claims a priority to Chinese Patent Application No. 201810244394.3 filed on Mar. 23, 2018, the disclosures of which are incorporated in their entirety by reference herein.

TECHNICAL FIELD

The present disclosure relates to the field of communications technology, in particular to an application processor and a mobile terminal.

BACKGROUND

As is well known, an existing mobile terminal includes an application processor (Application Processor, AP) and a display driver chip (Display Driver IC, DDIC). The application processor is equipped with a graphics processor (Graphic Processing Unit, GPU). An image frame is generated by the graphics processor and outputted to the display driver chip; then the display driver chip performs display of outputting the image frame. A display mode of the mobile terminal usually includes a VDO mode (Video Mode Panel) and a CMD mode (Command Mode Panel). In the VDO mode, a system is in a low-frame-rate output display state (for example, a static picture, the system repeatedly outputs the same image frame); in the CMD mode, the system is in a high-frame-rate output display state, and in such a case, the system outputs dynamic high-frame-rate image frames.

Whether in the VDO mode or in the CMD mode, image frames are usually outputted to the display driver chip at a fixed frequency. The display driver chip controls display of the image frames, and the panel displays the image frames, but this will cause the graphics processor to generate image frames at a fixed frequency, resulting in high power consumption of the mobile terminal.

SUMMARY

The embodiments of the present disclosure provide an application processor and a mobile terminal to reduce an overall power consumption of the mobile terminal.

In a first aspect, embodiments of the present disclosure provide a mobile terminal. The mobile terminal includes: a power management module, an application processor, a display driver chip, and a display panel, wherein the power management module is used to output a power supply voltage to the application processor, the display driver chip, and the display panel. The application processor includes: a graphics processor, a graphics random access memory, and a display serial interface, wherein the graphics random access memory is communicably connected with a codec overlay hardware of the graphics processor and is used to receive and store an image frame outputted by the graphics processor; the graphics random access memory is further communicably connected with the display serial interface, and is used to output a stored image frame to the display driver chip through the display serial interface; the display driver chip controls the display panel to display the received image frame.

In a second aspect, the embodiments of the present disclosure also provide an application processor, wherein the application processor includes: a graphics processor, a graphics random access memory, and a display serial interface, wherein the graphics random access memory is communicably connected with a codec overlay hardware of the graphics processor and is used to receive and store an image frame outputted by the graphics processor; the graphics random access memory is also communicably connected with the display serial interface and is used to output a stored image frame.

In the embodiments of the present disclosure, the mobile terminal is set to include the power management module, the application processor, the display driver chip, and the display panel, wherein the power management module is used to output the power supply voltage to the application processor, the display driver chip and the display panel; the application processor includes the graphics processor, the graphics random access memory, and the display serial interface, wherein the graphics random access memory is communicably connected with the codec overlay hardware of the graphics processor, and is used to receive and store image frames outputted by the graphics processor; the graphics random access memory is also communicably connected with the display serial interface, and is used to output the stored image frame to the display driver chip through the display serial interface; the display driver chip controls the display panel to display the received image frame. Since a manufacturing process of the application processor is better than that of the display driver chip, the graphics random access memory provided in the application processor may ensure that the power consumption of the graphics random access memory is small, and in such a case, loss of electric power in the VDO mode may be reduced, therefore, in the embodiments, overall power consumption of the mobile terminal is reduced.

BRIEF DESCRIPTION OF THE DRAWINGS

In order to explain technical solutions of the embodiments of the present disclosure more clearly, the following will briefly introduce drawings that need to be used in description of the embodiments of the present disclosure. Obviously, the drawings in the following description are only some embodiments of the present disclosure. For those of ordinary skill in the art, other drawings can be obtained based on these drawings without creative labor.

DETAILED DESCRIPTION

Technical solutions in the embodiments of the present disclosure will be described clearly and completely with reference to the accompanying drawings in the embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative work fall within the protection scope of the present disclosure.

Figure 1:
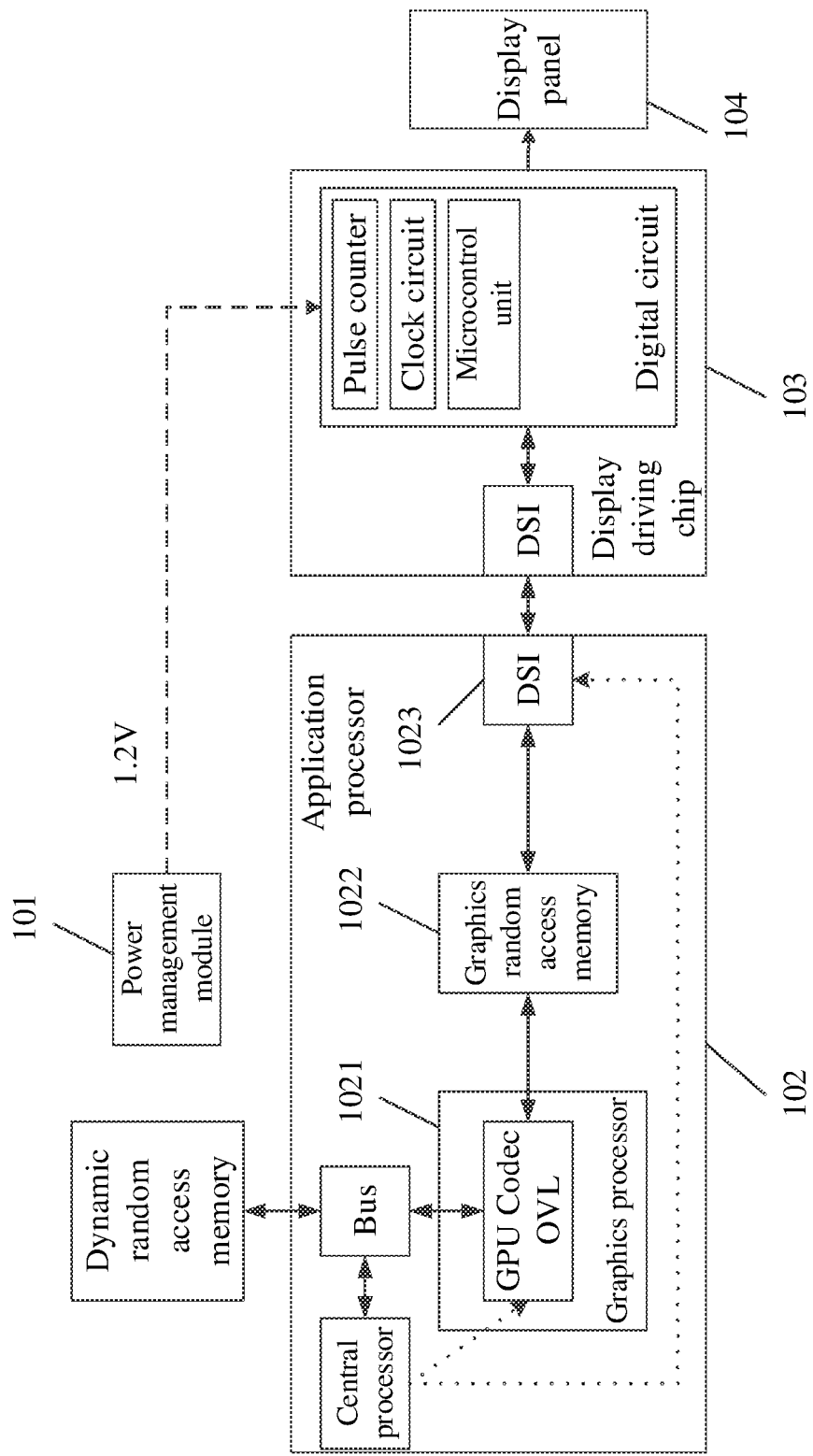
FIG. 1 is a first architecture diagram of a mobile terminal provided by an embodiment of the present disclosure.

Referring to FIG. 1, FIG. 1 is an architecture diagram of a mobile terminal provided by the present disclosure. As shown in FIG. 1, the mobile terminal provided in an embodiment of the present disclosure includes: a power management module 101, an application processor 102, a display driver chip 103, and a display panel 104, wherein the power management module 101 is used to output a power supply voltage to the application processor 102, the display driver chip 103 and the display panel 104; the application processor 102 includes a graphics processor 1021, a graphics random access memory 1022, and a display serial interface (Display Serial Interface, DSI) 1023, wherein the graphics random access memory 1022 is communicably connected with a codec overlay hardware (GPU Codec OVL (Overlay hardware)) of the graphics processor 1021, is used to receive and store image frames outputted by the graphics processor 1021; the graphics random access memory 1022 is also communicably connected with the display serial interface 1023, and is used to output the stored image frames to the display driver chip 103 through the display serial interface 1023; the display driver chip 103 controls the display panel 104 to display the received image frames.

In this embodiment, the foregoing application processor includes a central processing unit (Central Processing Unit, CPU), a bus (BUS), the graphics processor 1021, the graphics random access memory 1022, and the display serial interface 1023. Specifically, the central processor may be communicably connected with an external dynamic random-access memory (Dynamic Random-Access Memory, DRAM) via a bus.

During operation, a display mode of the mobile terminal may be set to be in the VDO mode or in the CMD mode. In the VDO mode, the graphics random access memory 1022 can store a target image frame outputted by the graphics processor 1021, and repeatedly output the target image frame to the display driver chip 103 through the display serial interface 1023 according to a preset frequency, and then the display driver chip 103 controls the display panel 104 for display. In this way, in the VDO mode, operations of some devices (such as the central processor and the graphics processor 1021 and other devices that do not need to perform operations) in the application processor can be turned off, thereby achieving a purpose of saving power. In the CMD mode, the graphics processor 1021 can output image frames to the graphics random access memory 1022, and then the graphics random access memory 1022 outputs the stored image frames to the display driver chip 103 at a preset frequency, and then the display driver chip 103 controls the display panel 104 for display.

In the embodiment of the present disclosure, the mobile terminal is set to include the power management module 101, the application processor 102, the display driver chip 103, and the display panel 104, wherein the power management module 101 is used to output the power supply voltage to the application processor 102, the display driver chip 103 and the display panel 104; the application processor 102 includes the graphics processor 1021, the graphics random access memory 1022, and the display serial interface 1023, wherein the graphics random access memory 1022 is communicably connected with the codec overlay hardware of the graphics processor 1021, and is used to receive and store image frames outputted by the graphics processor 1021; the graphics random access memory 1022 is also communicably connected with the display serial interface 1023, and is used to output the stored image frames to the display driver chip 103 through the display serial interface 1023; the display driver chip 103 controls the display panel 104 to display the received image frames. Since a manufacturing process of the application processor 102 is better than that of the display driver chip 103, the graphics random access memory 1022 provided in the application processor 102 may ensure that the power consumption of the graphics random access memory 1022 is small, and in such a case, loss of electric power in the VDO mode may be reduced, therefore, in this embodiment, overall power consumption of the mobile terminal is reduced.

It should be understood that, in a mobile terminal, in order to reduce requirement on the graphics random access memory 1022, the image frames stored in the graphics random access memory 1022 can usually be compressed. That is, in this embodiment, a graphics compression circuit and a graphics decompression circuit can also be provided in the mobile terminal. Specifically, a location where the graphics decompression circuit is set can be set according to actual needs, and different set locations of the circuits result in different structures of the application processor 102 and the display driver chip 103, which will be described in detail below.

Figure 2:
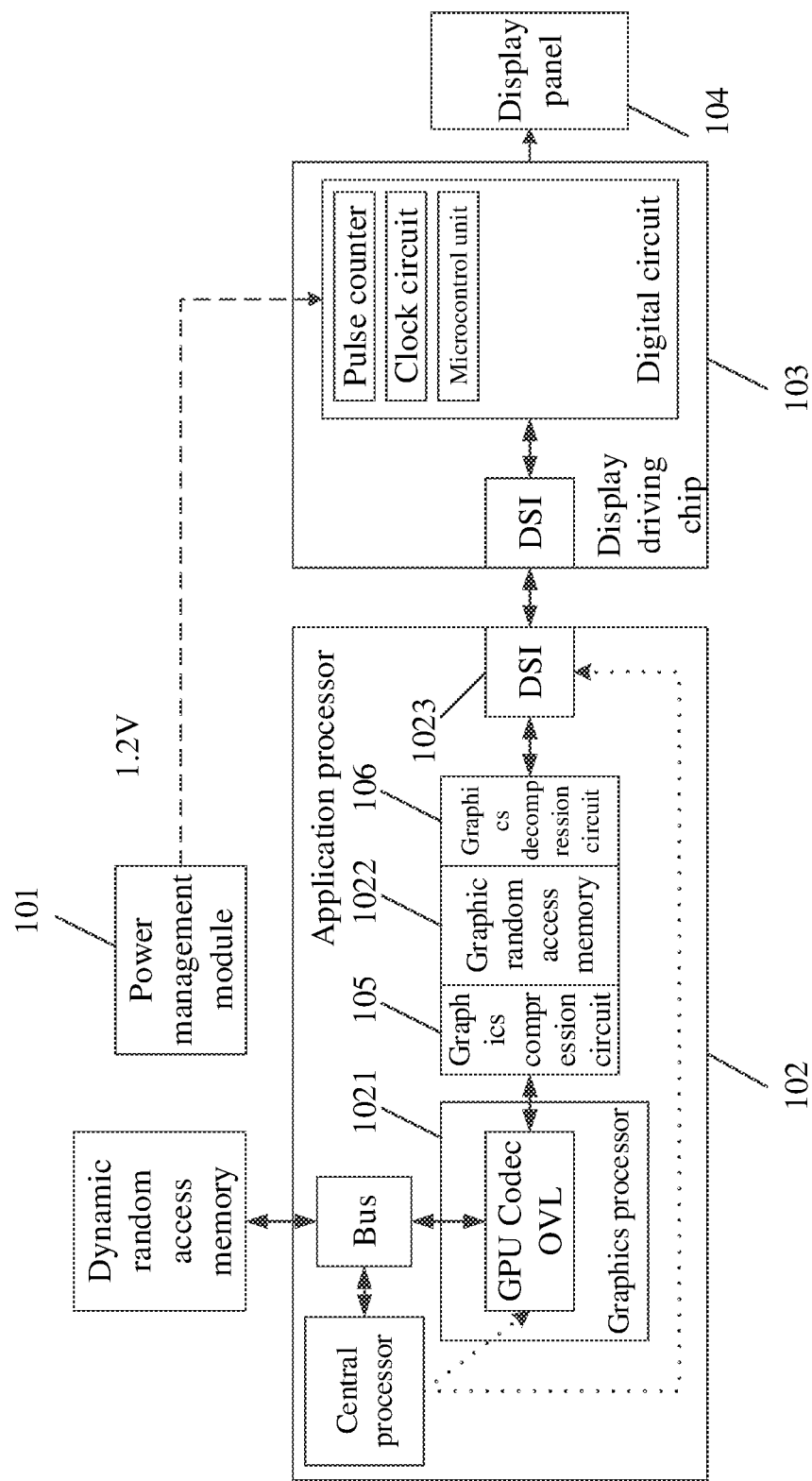
FIG. 2 is a second structural diagram of a mobile terminal provided by an embodiment of the present disclosure.

Specifically, in a first implementation, both the graphics compression circuit and the graphics decompression circuit are provided in the application processor 102. As shown in FIG. 2, in this implementation, the mobile terminal further includes a graphics compression circuit 105 and a graphics decompression circuit 106; both the graphics compression circuit 105 and the graphics decompression circuit 106 are provided in the application processor 102, wherein, the graphics compression circuit 105 is connected in series between the codec overlay hardware of the graphics processor 1021 and the graphics random access memory 1022, and is used to compress the image frames outputted by the graphics processor 1021 and output the compressed image frames to the graphics random access memory 1022; the graphics decompression circuit 106 is connected in series between the display serial interface 1023 and the graphics random access memory 1022, and is used to decompress the image frames stored in the graphics random access memory 1022 and output the image frames to the display serial interface 1023.

Since the graphics compression circuit 105 and the graphics decompression circuit 106 are provided in this embodiment, requirements for processing image frames by the display driver chip 103 can be reduced, and in such a case, arrangement of the graphics compression circuit 105 and the graphics decompression circuit 106 in the application processor 102 can reduce the power consumption of the graphics compression circuit 105 and the graphics decompression circuit 106. In this way, in this embodiment, a larger batch of DRAM access capabilities can be provided, DRAM usage efficiency can be increased, DRAM switching times can be reduced, and a DRAM power can be reduced. Therefore, the power consumption of an overall system in a bright screen state can be greatly improved.

Figure 3:
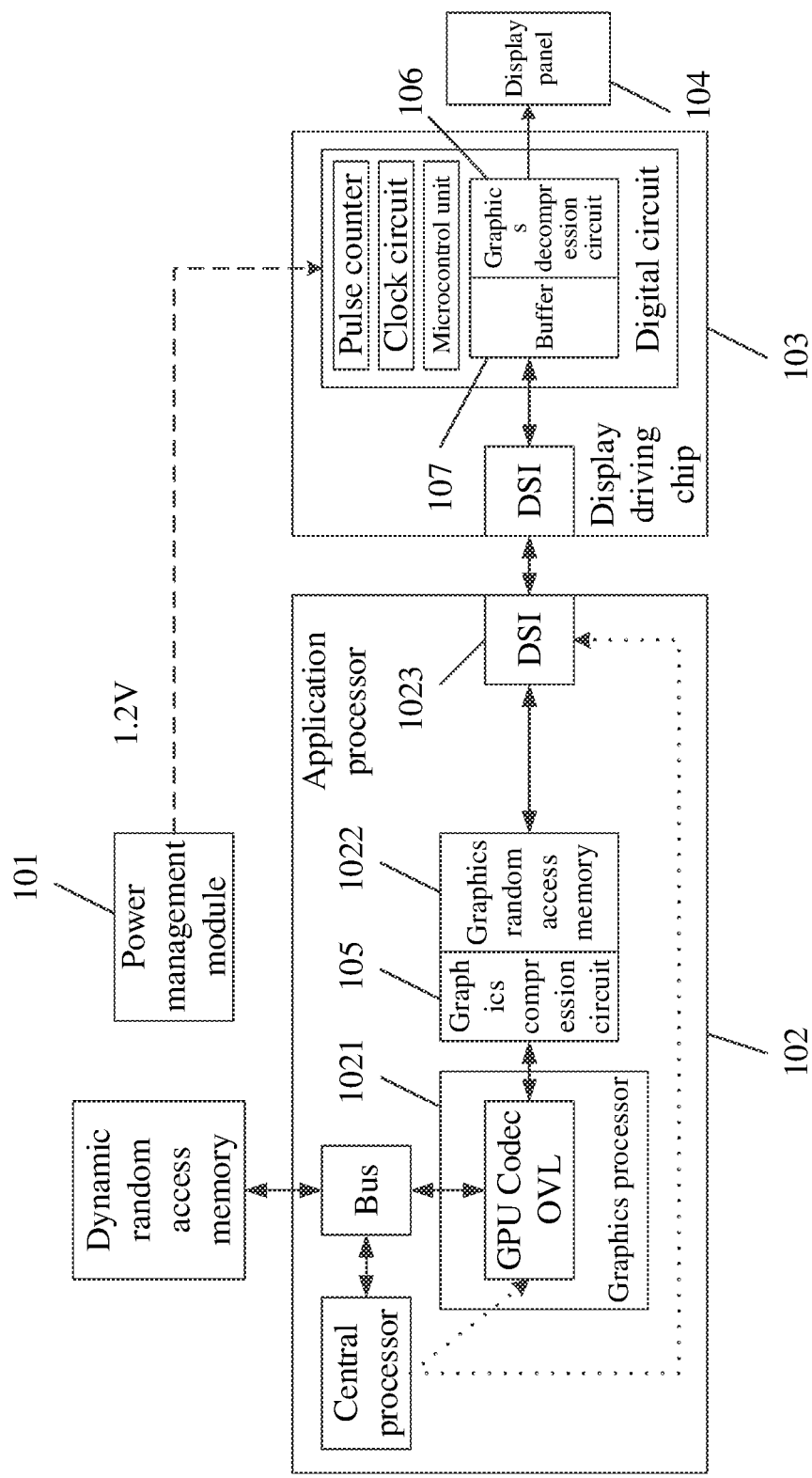
FIG. 3 is a third structural diagram of a mobile terminal provided by an embodiment of the present disclosure.

In a second implementation, the graphics compression circuit is provided in the application processor 102, and the graphics decompression circuit is provided in the display driver chip 103. As shown in FIG. 3, in this implementation, the mobile terminal further includes the graphics compression circuit 105, the graphics decompression circuit 106, and a buffer 107, wherein, the graphics compression circuit 105 is disposed in the application processor 102, and the graphics compression circuit 105 is connected in series between the codec overlay hardware of the graphics processor 1021 and the graphics random access memory 1022, and is used to compress the image frames outputted by the graphics processor 1021 and output the compressed image frames to the graphics random access memory 1022. The graphics decompression circuit 106 and the buffer 107 are provided in the display driver chip 103 and are used to decompress the image frames received from the application processor 102.

In this implementation, the display driver chip 103 further includes a display serial interface and a digital circuit, the digital circuit may include a pulse counter (TP_ctrl), a clock circuit (timer), and a micro control unit (Micro Control Unit, MCU). The aforementioned decompression circuit can be used as a part of the digital circuit. A buffer size of the aforementioned buffer 107 can be set according to actual needs. For example, in this embodiment, the buffer is mainly used as a line buffer.

During operation, the image frames outputted by the graphics processor 1021 is compressed by the graphics compression circuit 105 and stored in the graphics random access memory 1022. The compressed image frames stored in the graphics random access memory 1022 are transmitted to the display driver chip through the display serial interface 1023 and are stored in the buffer 107 of the display driver chip 103. After the image frames are decompressed by the graphics decompression circuit 106, the display panel 104 is controlled to display the corresponding image frames. In this way, the image frames transmitted between the application processor 102 and the display driver chip 103 are compressed image frames.

In the second implementation, a larger batch of DRAM access capabilities can be provided, DRAM usage efficiency can be increased, and DRAM switching times can be reduced, thereby reducing overall system power consumption. In addition, keeping a decompressed part inside the DDIC can reduce a DSI transmission volume (in an example of FHD1080p DSC compression being 3 times, the DSI transmission volume in FIG. 3 is left to be ⅓) so as to achieve an effect of saving DSI power consumption.

Figure 4:
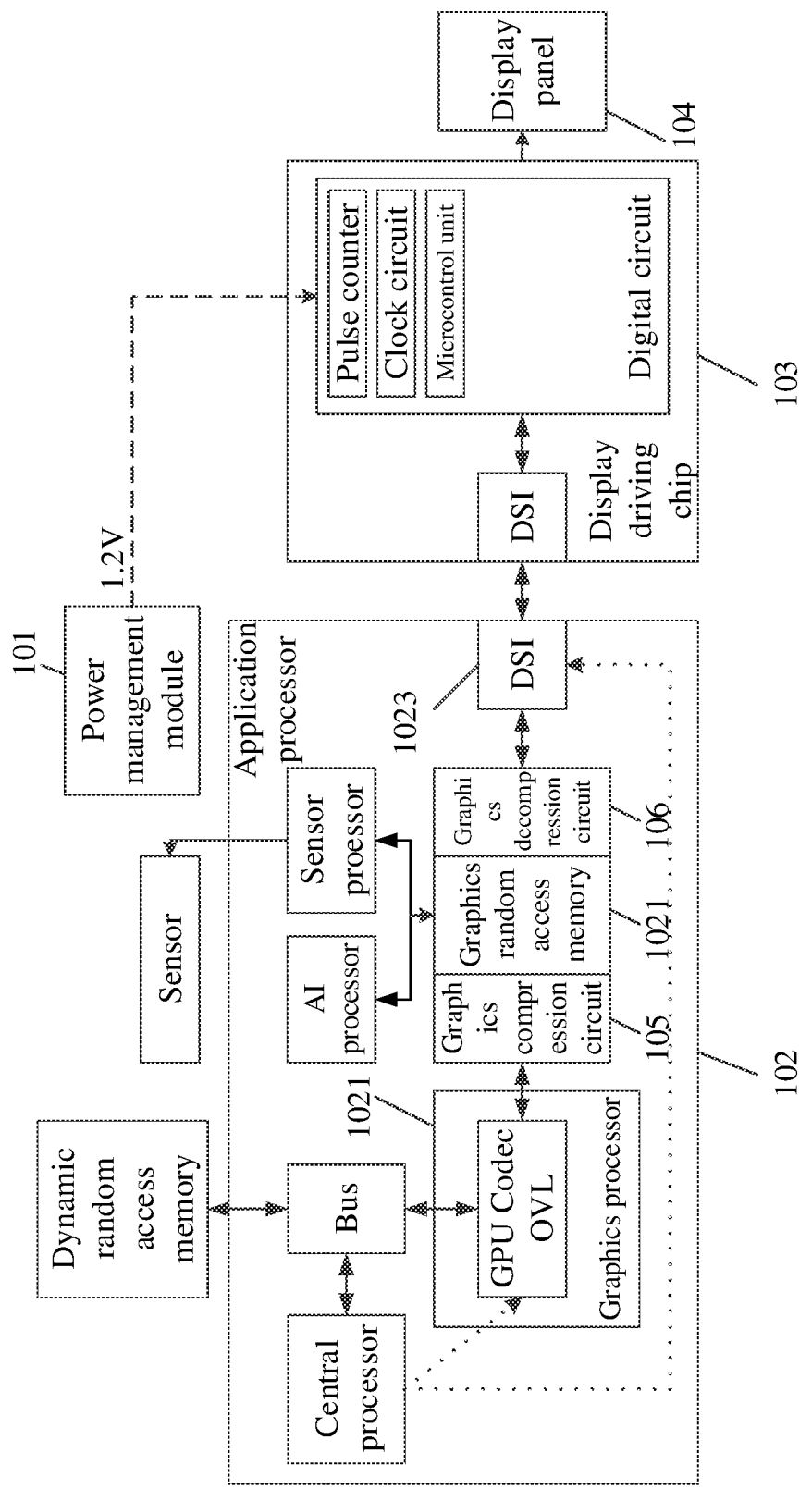
FIG. 4 is a fourth structural diagram of a mobile terminal provided by an embodiment of the present disclosure.

Further, referring to FIG. 4, the application processor 102 may further include an artificial intelligence (Artificial Intelligence, AI) processor, and the AI processor is communicably connected with the graphics random access memory 1022. The AI processor is added to be communicably connected with the graphics random access memory 1022, so that reuse of the graphics random access memory 1022 can be realized.

In addition, in another embodiment, the application processor 102 further includes a sensor processor (Sensor Processor), and the sensor processor is communicably connected with the graphics random access memory. The sensor processor is connected to the graphics random access memory 1022, so that reuse of the graphics random access memory 1022 can be realized.

In a mobile terminal system in the related art, the DDIC is immediately closed after a screen in the system goes dark, and the application processor cannot use a memory storage space of the DDIC. In the embodiments of the present disclosure, the graphics random access memory 1022 is added to the application processor 102, so that in an off-screen scenario, the AI processor or the sensor processor can reuse the graphics random access memory 1022, so as to enable the internal AI processor or the sensor processor to be matched for developing more and richer low-power-consumption dark-screen-scene Apps without waking up the AP Processor and the DRAM (reducing power consumption of waking up the huge Android AP system), such as a low-power-consumption MP3 playback, an active noise reduction, a pedometer, a voice wake-up, fingerprint recognition wake-up, dark-screen AI face recognition wake-up, and more low-power Internet-of-Things applications. The power consumption of a traditional single-application embedded system (Embedded System) is achieved in this case.

In this embodiment, when a screen of the mobile terminal is in an on-screen state, the graphics random access memory 1022 is used for refreshing the screen (that is, used to store image frames of the graphics processor 1021). When the screen is in an off-screen state, the graphics random access memory 1022 is used by the AI processor or the sensor processor, thereby reducing needs for waking up and executing huge Android application processors and DRAM, and achieving a power-saving effect in a dark screen scene.

Further, a power supply voltage outputted by the power management module 101 includes a target voltage for supplying power to a digital circuit in the display driver chip 103, and the target voltage is equal to an operating voltage of the digital circuit, where the operating voltage is a minimum input voltage in a case that the input voltage of the digital circuit is represented as a high level, and an output terminal of the power management module for outputting the target voltage is connected to the digital circuit.

In this embodiment, a value of the above-mentioned operating voltage is related to a manufacturing process of the display driver chip 103, and the operating voltage is usually 1.2V (or 1.0V, depending on the manufacturing process). In this way, the output terminal of the power management module for outputting the target voltage is connected to the digital circuit, thereby eliminating a low voltage-difference linear voltage-regulator (low dropout regulator, LDO) and eliminating an electric-energy loss resulting from the low dropout regulator.

It may be understood that, in this embodiment, if the display driver chip 103 retains the low dropout regulator, an outputted target voltage close to the operating voltage may be used for power supply. For example, the provided target voltage is slightly greater than the operating voltage, assuming that the operating voltage is 1.2V, the target voltage of 1.35V can be used to be outputted to the digital circuit. In this way, a power loss of the LDO can also be reduced.

Further, the embodiments of the present disclosure also provide an application processor, the application processor includes a graphics processor, a graphics random access memory and a display serial interface, wherein the graphics random access memory is communicably connected with a codec overlay hardware of the graphics processor, and is used to receive and store image frames outputted by the graphics processor; the graphics random access memory is also communicably connected with the display serial interface, so as to output the stored image frames.

A structure and an operating principle of the application processor provided in the embodiments of the present disclosure may be obtained by referring to description of the application processor of the above mobile terminal, and details thereof are not repeated here. Since the manufacturing process of the application processor is better than that of the display driver chip, setting the graphics random access memory in the application processor can ensure that the power consumption of the graphics random access memory is small, and at the same time, power consumption in the VDO mode may be reduced. Therefore, in this embodiment, an overall power consumption of the mobile terminal is reduced.

Optionally, the application processor further includes a graphics compression circuit connected in series between the codec overlay hardware of the graphics processor and the graphics random access memory, and the graphics compression circuit is used to compress the image frames outputted by the graphics processor and output the compressed image frames to the graphics random access memory.

Since the graphics compression circuit and graphics decompression circuit are provided in this embodiment, the requirements on the display driver chip for processing image frames can be reduced. At the same time, the graphics compression circuit and the graphics decompression circuit are installed in the application processor, which can reduce the power consumptions of the graphics compression circuit and the graphics decompression circuit. In this way, in this embodiment, a larger batch of DRAM access capabilities can be provided, DRAM usage efficiency can be increased, DRAM switching times can be reduced, and DRAM power can be reduced. Therefore, the power consumption of an overall system in a bright screen state can be greatly improved.

Optionally, the application processor further includes a graphics decompression circuit connected in series between the display serial interface and the graphics random access memory, and the graphics decompression circuit is used to decompress the image frames stored in the graphics random access memory, and output the decompressed image frames to the display serial interface.

In this embodiment, a larger batch of DRAM access capabilities can be provided, DRAM usage efficiency can be increased, and DRAM switching times can be reduced, thereby reducing overall system power consumption. In addition, keeping a decompressed part inside the DDIC can reduce a DSI transmission volume (in an example of FHD1080p DSC compression being 3 times, the DSI transmission volume in FIG. 3 is left to be ⅓) so as to achieve an effect of saving DSI power consumption.

Optionally, the application processor further includes an AI processor, and the AI processor is communicably connected with the graphics random access memory.

Optionally, the application processor further includes: a sensor processor, and the sensor processor is communicably connected with the graphics random access memory.

In this embodiment, when a screen of the mobile terminal is in an on-screen state, the graphics random access memory is used for refreshing the screen (that is, used to store image frames of the graphics processor). When the screen is in an off-screen state, the graphics random access memory is used by the AI processor or the sensor processor, thereby reducing needs for waking up and executing huge Android application processors and DRAM, and achieving a power-saving effect in a dark screen scene.

Figure 5:
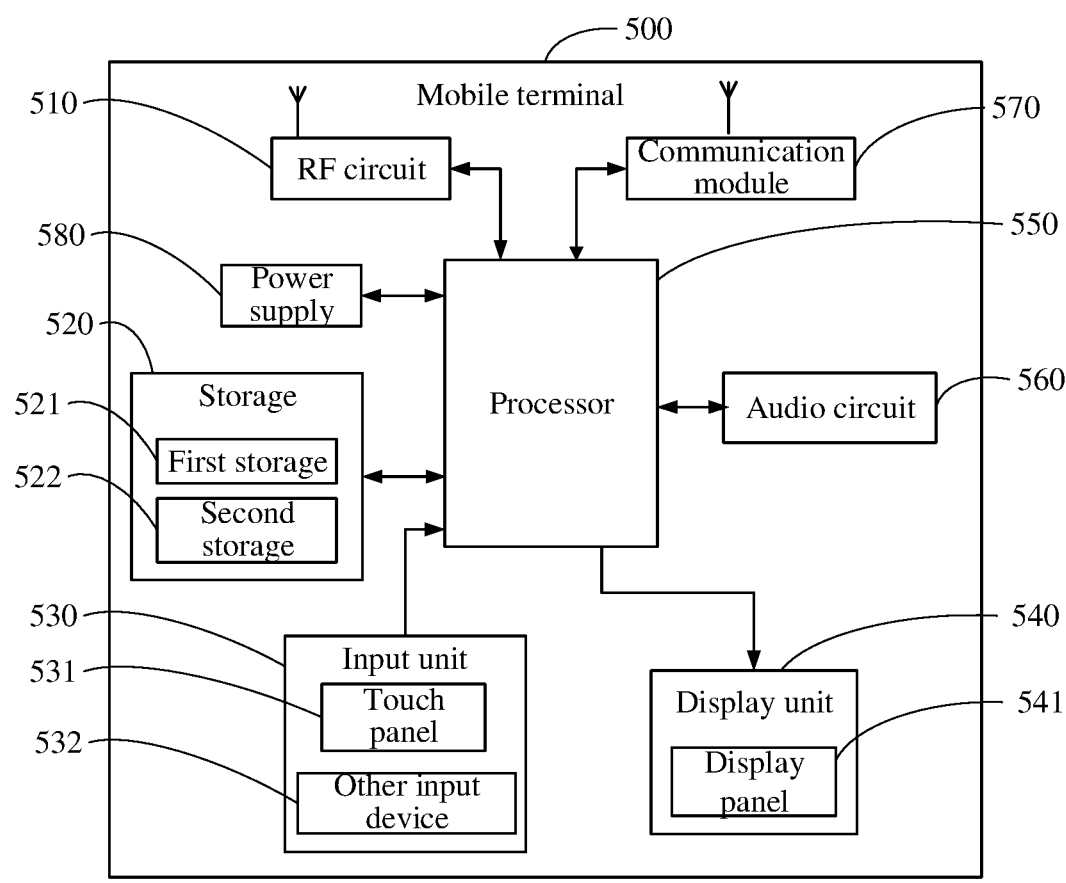
FIG. 5 is a structural diagram of a mobile terminal provided by an embodiment of the present disclosure.

Referring to FIG. 5, FIG. 5 is a structural diagram of a mobile terminal provided by an embodiment of the present disclosure.

As shown in FIG. 5, the mobile terminal 500 includes a radio frequency (Radio Frequency, RF) circuit 510, a storage 520, an input unit 530, a display unit 540, a processor 550, an audio circuit 560, a communication module 570, a power supply 580, and a power management module, an application processor, a display driver chip and a display panel, wherein, the power management module is used to output a power supply voltage to the application processor and the display driver chip; the application processor includes a graphics processor, a graphics random access memory, and a display serial interface, wherein the graphics random access memory is communicably connected with the codec overlay hardware of the graphics processor, and is used to receive and store the image frames outputted by the graphics processor; the graphics random access memory is also communicably connected with the display serial interface, and is used to output the stored image frames to the display driver chip through the display serial interface; the display driver chip controls the display panel in the display unit to display the received image frames.

Optionally, the mobile terminal further includes a graphics compression circuit, a graphics decompression circuit, and a buffer, wherein, the graphics compression circuit is arranged in the application processor, and the graphics compression circuit is connected in series between the codec overlay hardware of the graphics processor and the graphics random access memory, and is used to compress the image frames outputted by the graphics processor and output the compressed image frames to the graphics random access memory; the graphics decompression circuit and the buffer are arranged in the display driver chip, and are used for decompressing the image frames received from the application processor.

Optionally, the mobile terminal further includes a graphics compression circuit and a graphics decompression circuit; both the graphics compression circuit and the graphics decompression circuit are provided in the application processor, wherein, the graphics compression circuit is connected in series between the codec overlay hardware of the graphics processor and the graphics random access memory, and is used to compress the image frames outputted by the graphics processor and output the compressed image frames to the graphics random access memory.

The graphics decompression circuit is connected in series between the display serial interface and the graphics random access memory, and is used to decompress the image frames stored in the graphics random access memory and output the decompressed image frames to the display serial interface.

Optionally, the application processor further includes an AI processor, and the AI processor is communicably connected with the graphics random access memory.

Optionally, the application processor further includes: a sensor processor, and the sensor processor is communicably connected with the graphics random access memory.

Optionally, a power supply voltage outputted by the power management module includes a target voltage for supplying power to a digital circuit in the display driver chip, the target voltage is equal to an operating voltage of the digital circuit, wherein the operating voltage is a minimum input voltage in a case that the input voltage of the digital circuit is expressed as a high level, and the output terminal of the power management module for outputting the target voltage is connected to the digital circuit.

It should be understood that, the aforementioned application processor may be a part of the processor 550 or an independent processor.

In the embodiment of the present disclosure, the mobile terminal is set to include the power management module, the application processor, the display driver chip, and the display panel, wherein the power management module is used to output the power supply voltage to the application processor, the display driver chip and the display panel; the application processor includes the graphics processor, the graphics random access memory, and the display serial interface, wherein the graphics random access memory is communicably connected with the codec overlay hardware of the graphics processor, and is used to receive and store image frames outputted by the graphics processor; the graphics random access memory is also communicably connected with the display serial interface, and is used to output the stored image frames to the display driver chip through the display serial interface; the display driver chip controls the display panel to display the received image frames. Since a manufacturing process of the application processor is better than that of the display driver chip, the graphics random access memory provided in the application processor may ensure that the power consumption of the graphics random access memory is small, and in such a case, loss of electric power in the VDO mode may be reduced, therefore, in this embodiment, overall power consumption of the mobile terminal is reduced.

The input unit 530 may be used to receive digital or character information inputted by a user and generate a signal input related to user-setting and function control of the mobile terminal 500. Specifically, in the embodiments of the present disclosure, the input unit 530 includes a touch panel 531. The touch panel 531, also referred to as a touch screen, may collect a touch operation (e.g., an operation of a user using any suitable object or accessory, such as a finger, stylus, or the like, on or near the touch panel 531) of the user on or near the touch panel 531, and drive a corresponding connected device according to a preset program. Optionally, the touch panel 531 may include two parts, i.e., a touch detection device and a touch controller. The touch detection device detects a touch orientation of the user, detects a signal brought about by a touch operation, transmits the signal to the touch controller, and the touch controller receives touch information from the touch detection device, converts the touch information into contact coordinates and sends the contact coordinates to the processor 550, and receives and executes commands from the processor 550. In addition, the touch panel 531 may be implemented in various types such as a resistance type, a capacitance type, an infrared ray, and a surface acoustic wave. The input unit 530 may also include other input devices 532 in addition to the touch panel 531. The other input devices 532 may include, but are not limited to, a physical keyboard, function keys (such as volume control keys, switch keys, etc.), a trackball, a mouse, and a joystick.

The display unit 540 can be used to display information inputted by the user or information provided to the user and various menu interfaces of the mobile terminal 500. The display unit 540 may include a display panel 541. Optionally, the display panel 541 may be configured in a form of a LCD or an organic light-emitting diode (Organic Light-Emitting Diode, OLED).

It should be noted that the touch panel 531 may be overlaid on the display panel 541 to form a touch display screen. When the touch display screen detects a touch operation on or near the touch display screen, information of the touch operation is transmitted to the processor 550 to determine a type of a touch event, and then the processor 550 provides a corresponding visual output on the touch screen according to the type of the touch event.

The touch display screen includes an application program interface display area and a common control display area. An arrangement of the application program interface display area and the common control display area is not limited, and can be an arrangement capable of differentiating two display areas, such as an up-down arrangement, a left-right arrangement, etc. The application program interface display area can be used to display an interface of an application program. Each interface may contain an icon of at least one application and/or a widget desktop control and the like. The application program interface display area may also be an empty interface that does not contain any content. The common control display area is used to display controls with a high usage rate, for example, application icons such as setting buttons, interface numbers, scroll bars, and phonebook icons.

The processor 550 is a control center of the mobile terminal 500. The processor 550 uses various interfaces and lines to connect various parts of the entirety of the mobile phone. By running or executing software programs and/or modules stored in a first storage 521, and calling data in a second storage 522, the processor 550 executes various functions of the mobile terminal 500 and processes data, thereby monitoring the mobile terminal 500 as a whole. Optionally, the processor 550 may include one or more processing units.

The mobile terminal may include at least one of a mobile phone, a tablet computer, an e-book reader, a digital camera, a laptop computer, a smart TV, and a wearable device.

The above are only specific implementations of the present disclosure, but the protection scope of the present disclosure is not limited thereto. Any person skilled in the art can easily conceive of changes or substitutions within the technical scope disclosed in the present disclosure, all of which shall be contained within the protection scope of this disclosure. Therefore, the protection scope of the present disclosure should be consistent with the protection scope of the claims.

What is claimed is:
1. A mobile terminal, comprising:
a power management module, an application processor, a display driver chip and a display panel, wherein,
the power management module is used to output a power supply voltage to the application processor, the display driver chip, and the display panel;
the application processor includes: a graphics processor, a graphics random access memory, and a display serial interface, wherein the graphics random access memory is communicably connected with a codec overlay hardware of the graphics processor, and is used to receive and store an image frame outputted by the graphics processor; the graphics random access memory is further communicably connected with the display serial interface, and is used to output a stored image frame to the display driver chip through the display serial interface;
the display driver chip controls the display panel to display the received image frame,
wherein the mobile terminal further comprises:
a graphics compression circuit and a graphics decompression circuit both the graphics compression circuit and the graphics decompression circuit are arranged in the application processor, wherein,
the graphics compression circuit is connected in series between the codec overlay hardware of the graphics processor and the graphics random access memory, and is used to compress the image frame outputted by the graphics processor and output the compressed image frame to the graphics random access memory;
the graphics decompression circuit is connected in series between the display serial interface and the graphics random access memory, and is used to decompress an image frame stored in the graphics random access memory and output the decompressed image frame to the display serial interface.
2. The mobile terminal according to claim 1, wherein the application processor further comprises an artificial intelligence (AI) processor, the AI processor is communicably connected with the graphics random access memory.

3. The mobile terminal according to claim 2, wherein the power supply voltage outputted by the power management module comprises a target voltage used to supply power to a digital circuit in the display driver chip, the target voltage is equal to an operating voltage of the digital circuit, wherein the operating voltage is a minimum input voltage in a case that the input voltage of the digital circuit is expressed as a high level, and an output terminal of the power management module is connected with the digital circuit, the output terminal being used for outputting the target voltage.

4. The mobile terminal according to claim 1, wherein the application processor further comprises a sensor processor, the sensor processor is communicably connected with the graphics random access memory.

5. The mobile terminal according to claim 4, wherein the power supply voltage outputted by the power management module comprises a target voltage used to supply power to a digital circuit in the display driver chip, the target voltage is equal to an operating voltage of the digital circuit, wherein the operating voltage is a minimum input voltage in a case that the input voltage of the digital circuit is expressed as a high level, and an output terminal of the power management module is connected with the digital circuit, the output terminal being used for outputting the target voltage.

6. The mobile terminal according to claim 1, wherein the power supply voltage outputted by the power management module comprises a target voltage used to supply power to a digital circuit in the display driver chip, the target voltage is equal to an operating voltage of the digital circuit, wherein the operating voltage is a minimum input voltage in a case that the input voltage of the digital circuit is expressed as a high level, and an output terminal of the power management module is connected with the digital circuit, the output terminal being used for outputting the target voltage.

7. An application processor, comprising:
a graphics processor, a graphics random access memory, and a display serial interface, wherein the graphics random access memory is communicably connected with a codec overlay hardware of the graphics processor, and is used to receive and store an image frame outputted by the graphics processor; the graphics random access memory is further communicably connected with the display serial interface, and is used to output a stored image frame through the display serial interface, wherein the application further comprises:
a graphics compression circuit connected in series between the codec overlay hardware of the graphics processor and the graphics random access memory, wherein the graphics compression circuit is used to compress the image frame outputted by the graphics processor and output the compressed image frame to the graphics random access memory; and
a graphics decompression circuit connected in series between the display serial interface and the graphics random access memory, wherein the graphics decompression circuit is used to decompress an image frame stored in the graphics random access memory and output the decompressed image frame to the display serial interface.

8. The application processor according to claim 7, further comprising:
an artificial intelligence (AI) processor, wherein the AI processor is communicatively connected with the graphics random access memory.

9. The application processor according to claim 7, further comprising:
a sensor processor, wherein the sensor processor is communicably connected with the graphics random access memory.

10. The application processor according to claim 7, further comprising:
an artificial intelligence (AI) processor, wherein the AI processor is communicatively connected with the graphics random access memory.

11. The application processor according to claim 7, further comprising:
a sensor processor, wherein the sensor processor is communicably connected with the graphics random access memory.

* * * * *